United States Patent Office 3,808,228
Patented Apr. 30, 1974

3,808,228
ALKOXY PYRAZOLYLALKANES
Swiatoslaw Trofimenko, Newark, Del., assignor to E. I. du Pont de Nemours and Company, Wilmington, Del.
No Drawing. Continuation-in-part of abandoned application Ser. No. 89,134, Nov. 12, 1970. This application June 8, 1972, Ser. No. 260,823
Int. Cl. C07d 49/18
U.S. Cl. 260—310 R    13 Claims

ABSTRACT OF THE DISCLOSURE

Disclosed herein are compounds containing 1 or 2 pyrazole rings bonded by nuclear nitrogen to a carbon atom which bears one substituent selected from hydrogen, alkyl of up to 7 carbons, phenyl and benzyl, the remaining valence(s) being satisfied by 1 or 2 alkoxy group(s). Also disclosed is a process for making such compounds and their use, for example, as UV absorbers, chelating agents or chloral polymerization catalysts.

CROSS-REFERENCE TO RELATED APPLICATION

This is a continuation-in-part of application Ser. No. 89,134, filed on Nov. 12, 1970, now abandoned.

BACKGROUND OF THE INVENTION

(1) Field of the invention

This invention relates to novel compounds containing 1 or 2 alkoxy groups attached through carbon to the nitrogen(s) of 1 or 2 pyrazolyl rings.

(2) Description of the prior art

No art is known wherein an alkoxy group is attached to carbon which is directly bonded to a pyrazole nitrogen.

SUMMARY AND DETAILS OF THE INVENTION

This invention comprises novel alkoxy pyrazolylalkane compounds of the formula:

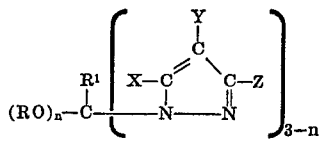

wherein:
$n = 1$ or 2,
R = alkyl of up to 7 carbons,
$R^1$ = selected from H, alkyl of up to 7 carbons, phenyl and benzyl,
X and Z = selected from H, alkyl of up to 8 carbons, phenyl, halogen, alkoxy of lower alkyl with the proviso that only one of X or Z can be alkoxy, and
Y = selected from H, lower alkyl, phenyl, CN, $NO_2$ and halogen.

The preferred compounds are dialkoxy monopyrazolylalkanes of the formula:

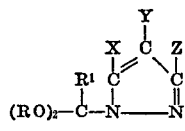

wherein:
R = lower alkyl,
$R^1$ = hydrogen or lower alkyl, and
X, Y and Z = hydrogen or lower alkyl.

These compounds are particularly useful as catalysts for the polymerization of chloral homopolymer and copolymers thereof with, say, isocyanates and ketenes. The expression "lower alkyl" means alkyl of up to 4 carbons.

Process

The novel compounds are made by reacting an appropriate pyrazole with an orthoester and the reaction mixture is heated to drive off the alcohol by-product. It is preferred, although not necessary, to conduct the reaction in the presence of a strong protonic acid catalyst which serves to greatly reduce the time for completion of the reaction.

The process comprises reacting the orthoester,

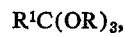

and the pyrazole,

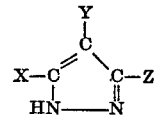

It is preferred to add a catalytic amount of a strong protonic acid. Some of each type of pyrazolylalkane, i.e., dialkoxy monopyrazolylalkane and monoalkoxy dipyrazolylalkane is obtained under all reaction conditions. The relative ratios of the pyrazole and orthoester reactants determine only the amount of and not the nature of the reaction products. It is preferred to employ a molar ratio of pyrazole/orthoester between about 1/2 and 3/1. The ratio of 1/2 especially favors formation of the monopyrazolylalkane. When the monoalkoxy dipyrazolylalkane is the desired major product, it is preferred to have a molar ratio of pyrazole/orthoester between about 1/1 and 3/1, and most preferably about 2/1. Molar ratios outside the range of 1/2 to 3/1 can be employed but no particular advantages result thereby.

By catalytic amount of a strong protonic acid is meant a sufficient quantity to affect appreciably the rate of reaction between pyrazole and orthoester, and such quantities are generally known to those skilled in the art. It is preferred to use quantities of about 0.05 to 1 g. per mole of limiting reactant. Suitable protonic acids include, inter alia, sulfuric acid; arylsulfonic acids such as p-toluenesulfonic acid, benzenesulfonic acid, p-isopropylbenzenesulfonic acid and the like; alkylsulfonic acids such as 2-propanesulfonic acid, methanesulfonic acid, ethanesulfonic acid, trifluoromethanesulfonic acid and the like. It is also possible to use a polymeric arylsulfonic acid. Other useful protonic acids and amounts in which they should be employed will be evident to those skilled in the art.

The reaction mixture is heated gently so that the alcohol, ROH, distils off slowly. The progress of the reaction may be followed by measuring the amount of ROH evolved. In some cases a binary azeotrope of ROH with the orthoester may form. The temperature of the reaction mixture is governed by the distillation range of the alcohol, and generally is between about 50° to 200° C. Pressure is generally atmospheric.

The pyrazole will generally be an equilibrium mixture of:

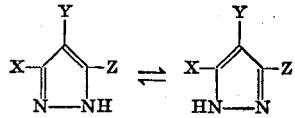

with similar isomers formed in the products.

In the following representation of the reaction mechanism, Compound I is the dialkoxy monopyrazolylalkane and Compound II is the monoalkoxy dipyrazolylalkane.

(a)

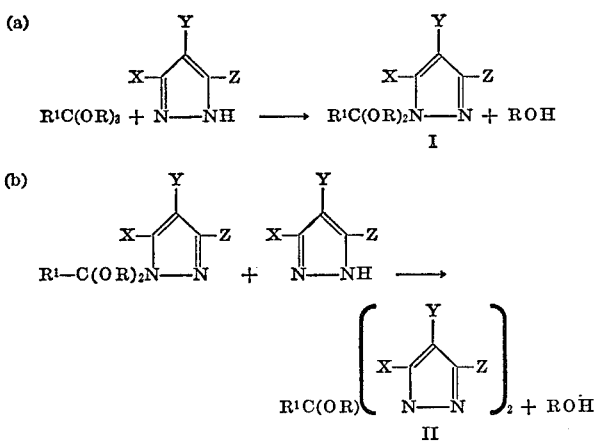

(b)

wherein:

R=alkyl of up to 7 carbons,
R¹=selected from H, alkyl of up to 7 carbons, phenyl and benzyl,
X and Z=selected from H, alkyl of up to 8 carbons, phenyl, halogen, alkoxy of lower alkyl with the proviso that only one of X or Z can be alkoxy, and
Y=selected from H, lower alkyl, phenyl, CN, NO₂ and halogen.

DESCRIPTION OF THE PREFERRED EMBODIMENTS

The following examples are illustrative only and are included within the broad scope of the invention.

EXAMPLE 1

1,1-diethoxy-1-pyrazolylmethane (A) and ethoxy bis(1-pyrazolyl)methane (B)

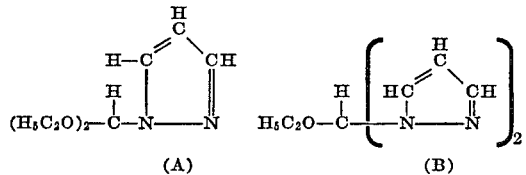

A mixture of 34 g. of pyrazole and 74 g. of triethyl orthoformate (both 0.5 mole) was heated at 140–150° and ethanol was distilled out through a Vigreaux column. When 29 ml. had distilled, the pressure was reduced and the product was distilled in vacuo. After a small forerun, the main cut, A, B.P. 60–61°/3 mm., $n_D^{25}$ 1.4552 came over in 63 g. yield. A second product, B, came over at 106°/2.7 mm., $n_D^{25}$ 1.5100 in 4.5 g. yield.

Product A contained about 20% unreacted pyrazole (by NMR). It was stirred with excess sodium hydride until hydrogen evolution ceased and was then redistilled. Pure A boils at 60°/2.5 mm.

*Analysis.*—Calcd. for $C_8H_{14}N_2O_2$ (A) (percent): C, 56.5; H, 8.29. Found (percent): C, 56.7; H, 8.52.

*Analysis.*—Calcd. for $C_9H_{12}N_4O$ (B) (percent): C, 56.2; H, 6.29; N, 29.2. Found (percent): C, 56.9; H, 6.36; N, 29.6.

The identity of both compounds was confirmed by ¹HNMR A: doublets at 2.55τ (J=2.5) and 2.81τ (J=1.7), a multiplet at 4.07τ plus ethyl multiplets around 6.45 and 8.95τ in 1:1:2:4:6 ratio. The —CH₂— quadruplet shows additional splitting (J=1.8) which disappears when the sample is heated and reappears on cooling. The NMR of B had doublets at 2.10τ (J=2.7) and 2.39τ (J=1.8), each split further (J=~0.4), singlet at 2.45τ, a "triplet" resolved as two overlapping doublets (J=1.8 and 2.7), a 3.75τ quadruplet (J=7) at 6.45τ and a triplet (J=7) at 8.96τ in 2:2:1:2:2:3 ratio.

EXAMPLE 2

1,1-dimethoxy-1-pyrazol-1-ylethane (A) and 1-methoxy-1,1-bis(pyrazol-1-yl)ethane (B)

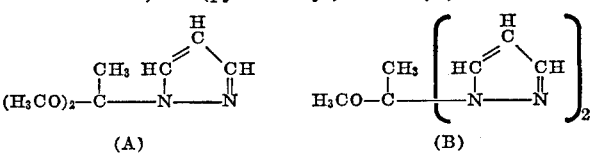

A mixture of 120 g. (1 mole) of trimethyl orthoacetate and 204 g. (3.0 moles) of pyrazole was stirred and heated along with 0.1 g. of p-toluenesulfonic acid until methanol ceased to distil. After removal of low boilers and pyrazole, two main cuts were taken: (A) B.P. 50–55°/3.9 mm., obtained in 84 g. yield and (B) B.P. 98–102/4.5 mm., obtained in 43 g. yield.

Fraction (A) was contaminated by about 40% unreacted pyrazole, as shown by NMR. It was stirred with excess sodium hydride and redistilled, to give purified (A), $n_D^{25}$ 1.4579.

*Analysis.*—Calcd. for $C_7H_{12}N_2O_2$ (percent): C, 53.8; H, 7.74; N, 17.9. Found (percent): C, 53.7; H, 7.77; N, 18.5.

The NMR spectrum of (A), neat, had doublets at 2.40τ (J=2.4, further split, J=0.7), 2.74 (J=1.7, further split, J=0.7), a triplet-like set of overlapping doublets (J=2.5, J=1.7) centered at 4.07τ, and singlets at 7.17 and 8.44τ in 1:1:1:6:3 ratio.

Fraction (B) solidified on standing and was pure 1-methoxy-1,1-bis(pyrazol-1-yl)ethane, M.P. 39–40°.

*Analysis.*—Calcd. for $C_9H_{12}N_4O$ (percent): C, 56.2; H, 6.29; N, 29.1. Found (percent): C, 56.5; H, 6.23; N, 29.0.

The NMR spectrum of (B) had two overlapping doublets at 2.47τ, a triplet at 3.72τ (J=2.0), and singlets at 6.71 and 7.58τ in 4:2:3:3 ratio.

EXAMPLE 3

α,α-Dimethoxy-1-benzylpyrazole

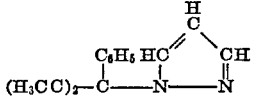

A mixture of 91 g. of trimethyl orthobenzoate (0.5 mole, 102 g. (1.5 mole) of pyrazole and 0.1 g. of p-toluenesulfonic acid was stirred and heated until the pot temperature reached 185°. Distillation of methanol ceased after 20 ml. (0.5 mole) has been collected.

The reaction mixture was distilled in vacuo removing lower-boiling components and excess pyrazole. The residue solidified and was purified by recrystallization from boiling hexane. The product was obtained in 19 g. (18%) yield and melted at 63–67°.

Its identity as α,α-dimethoxy-1-benzylpyrazole was established by ¹HnMR spectrum which had a doublet (J=2.5) at 2.02τ, a multiplet in the 2.3–2.9τ range, a triplet (J=2.0) at 3.77τ and a singlet at 6.88τ in the correct 1:6:1:6 ratio.

EXAMPLE 4

Dimethoxy-3,5-dimethyl-1-pyrazolylmethane

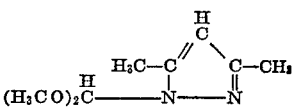

A mixture of 100 g. (1. mole) of 3,5-dimethylpyrazole, 200 g. (1.9 mole) of trimethyl orthoformate, and 1 g. of p-toluenesulfonic acid was stirred and heated until the fraction, B.P. 65–75, ceased to distil. Solid K₂CO₃ was added and the pot contents were distilled in vacuo. The main cut, B.P. 54–60°/1.1 mm., was obtained in 65 g. (38%) yield. It was redistilled from NaH to remove traces of 3,5-dimethylpyrazole.

*Analysis.*—Calcd. for $C_8H_{14}$–$N_2O_2$ (percent): C, 56.5; H, 8.24; N, 16.4. Found (percent): C, 56.9; H, 8.40; N, 15.9.

The NMR spectrum had singlets at 4.36, 4.48, 7.02, 8.03 and 8.18τ in the correct 1:1:6:3:3 ratio corresponding to dimethoxy 3,5-dimethyl-1-pyrazolylmethane.

EXAMPLE 5

Methoxybis(3,5-dimethyl-1-pyrazolyl)methane

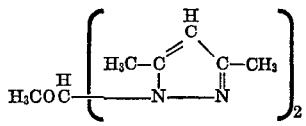

A mixture of 192 g. (2.0 moles) of 3,5-dimethylpyrazole, 135 g. of trimethyl orthoformate (1.25 mole, to make up for the 8:2 MeOH:HC(OMe)$_3$ azeotrope, B.P. 65° C.) and 1 g. of p-toluenesulfonic acid was heated so that the fraction B.P. 65° distilled out slowly.

When the reaction was over, the pot contents were distilled. After removal of pyrazole a product B.P. 120°/ 1.5 mm. came over in 95 g. (50%) yield. It solidified on standing, M.P. 57–59°. It was methoxybis(3,5-dimethyl-1-pyrazolyl)methane.

*Analysis.*—Calcd. for $C_{12}H_{18}N_4O$ (percent): C, 61.6; H, 7.70; N, 23.9. Found (percent): C, 62.4; H, 7.67; N, 24.7.

These values indicate contamination by tris(3,5-dimethyl-1-pyrazolyl)methane.

The NMR spectrum had singlets at 3.00, 4.13, 6.50, 7.63, and 7.80τ in the correct 1:2:3:6:6 ratio.

The table below shows novel pyrazolyl compounds made using trimethyl orthoformate and various pyrazoles, following the general procedure of Examples 4 and 5. The first column shows the literature pyrazole employed as a starting material with the orthoformate. The second column shows the novel dimethoxy monopyrazolylmethanes and the novel monomethoxy dipyrazolylmethanes.

TABLE

| Literature pyrazole | Novel alkoxy pyrazolylalkanes | |
| --- | --- | --- |
| 4-nitropyrazole | 1,1-dimethoxy-4-nitro-1-pyrazolylmethane | Methoxybis(4-nitro-1-pyrazolyl)methane. |
| 4-cyanopyrazole | 1,1-dimethoxy-4-cyano-1-pyrazolylmethane | Methoxybis(4-cyano-1-pyrazolyl)methane. |
| 4-chloropyrazole | 1,1-dimethoxy-4-chloro-1-pyrazolylmethane | Methoxybis(4-chloro-1-pyrazolyl)methane. |
| 4-iodopyrazole | 1,1-dimethoxy-4-iodo-1-pyrazolylmethane | Methoxybis(4-iodo-1-pyrazolyl)methane. |
| 4-bromopyrazole | 1,1-dimethoxy-4-bromo-1-pyrazolylmethane | Methoxybis(4-bromo-1-pyrazolyl)methane. |
| 3,4,5-tribromopyrazole | 1,1-dimethoxy-3,4,5-tribromo-1-pyrazolylmethane | Methoxybis(3,4,5-tribromo-1-pyrazolyl)methane. |
| 3,5-diethylpyrazole | 1,1-diethoxy-3,5-diethyl-1-pyrazolylmethane | Methoxybis(3,5-diethyl-1-pyrazolyl)methane. |
| 3,5-diphenylpyrazole | 1,1-dimethoxy-3,5-diphenyl-1-pyrazolylmethane | Methoxybis(3,5-diphenyl-1-pyrazolyl)-methane. |

TABLE—Continued

| Literature pyrazole | Novel alkoxy pyrazolylalkanes | |
|---|---|---|
| 3,5-di-t-butylpyrazole | 1,1-dimethoxy-3,5-di-t-butyl-1-pyrazolylmethane | Methoxybis(3,5-di-t-butyl-1-pyrazolyl)methane. |
| 3,5-dimethyl-4-bromopyrazole | 1,1-dimethoxy-4-bromo-3,5-dimethyl-1-pyrazolylmethane | Methoxybis(4-bromo-3,5-dimethyl-1-pyrazolyl)methane. |
| 3(and/or 5)-octylpyrazole | 1,1-dimethoxy-3-octyl-1-pyrazolylmethane | Methoxybis(3-octyl-1-pyrazolyl)methane. |
| | and/or | |
| | 1,1-dimethoxy-5-octyl-1-pyrazolylmethane | Methoxybis(5-octyl-1-pyrazolyl)methane. |
| 3,4,5-trimethylpyrazole | 1,1-dimethoxy-3,4,5-trimethyl-1-pyrazolylmethane | Methoxybis(3,4,5-trimethyl-1-pyrazolyl)-methane. |
| 3,4,5-triphenylpyrazole | 1,1-dimethoxy-3,4,5-triphenyl-1-pyrazolylmethane | Methoxybis(3,4,5-triphenyl-1-pyrazolyl)methane. |
| 3(and/or 5)-ethoxypyrazole | 1,1-dimethoxy-3-ethoxy-1-pyrazolylmethane | Methoxybis(3-ethoxy-1-pyrazolyl)methane. |
| | and/or | |
| | 1,1-dimethoxy-5-ethoxy-1-pyrazolylmethane | Methoxybis(5-ethoxy-1-pyrazolyl)methane. |

Of course, trimethyl orthoacetate (wherein $R^1=CH_3$, $R=CH_3$) or trimethyl orthobenzoate (wherein $R^1=C_6H_5$, $R=CH_3$), can be employed in place of the trimethyl orthoformate. Other operable orthoesters can also be used with pyrazoles as described above to give corresponding novel compounds. Such orthoesters include, for instance:

$CH_3CH_2CH_2CH_2C(OC_2H_5)_3$, wherein $R^1=C_4H_9$, $R=C_2H_5$;
$C_6H_5CH_2C(OC_2H_5)_3$, wherein $R^1=C_6H_5CH_2$, $R=C_2H_5$;
$C_6H_{11}C(OCH_3)_3$, wherein $R^1=C_6H_{11}$, $R=CH_3$; and
$C_5H_9C(OCH_3)_3$, wherein $R^1=C_5H_9$, $R=CH_3$.

Others are readily available by the procedure of Houben-Weyl "Methoden der organischen chemie"—Sauerstoff verbindungen Part 3, page 300. In these, the triethyl or trimethyl group can be replaced by other lower alkyl groups by trans-esterification procedures. For example, trimethyl orthoformate gives triheptyl orthoformate (wherein $R=C_7H_{13}$, $R^1=H$), by reaction with heptyl alcohol. Reaction of triheptyl orthoformate with pyrazole according to the process of Examples 4 and 5 yields 1,1-diheptyloxy-1-pyrazolylmethane and 1-heptyloxybis(1-pyrazolyl)methane.

UTILITY

Both the dialkoxy and the monoalkoxy pyrazolylalkanes have basic nitrogen in the pyrazole ring and are useful as acid acceptors, e.g., hydrogen halides are absorbed in reactions where the acids are released. An example of such a reaction is one between an acyl chloride and an alcohol. The pyrazole ring absorbs strongly in the ultraviolet region and thus the new compounds are usefuel as UV absorbers or screening agents.

The dipyrazolyl compounds are useful for chelating transition metal ions such as iron, cobalt, nickel, copper or zinc and extracting them from solution. The following example shows the chelating ability of ethoxybis(1-pyrazolyl)methane.

EXAMPLE A

To a mixture of 19.2 g. (0.1 mole) of ethoxybis(1-pyrazolyl)methane, 65 ml. of 0.5 M $Ni(OAc)_2$ solution and 100 ml. of methylene chloride was added 50 ml. of NH₄PF₆ solution. The blue nickel complex promptly went into the methylene chloride layer and was isolated by evaporation of the solvent as a blue glass.

The alkoxy pyrazolylalkanes are particularly useful as catalysts in the polymerization of chloral to give homopolymers and copolymers thereof with, for example, isocyanates and ketenes. For instances, chloral containing about 30% by weight of p-chlorophenylisocyanate was warmed to 55° C. and about 0.01–3 mol percent of the above-described new compounds added. The polymerization was effected by standing at room temperature for 6 hours to several days or by cooling to about 0° C. The polymer obtained is generally soluble in chloroform or toluene and solutions are useful for preparation of fibers, and films. The solid polymers are also useful for pressing films, at about 160° to 250° C., and molded articles. By the use of the product of Example 5, at 0.4 mol percent, the polymer obtained had an inherent viscosity of 1.12 and contained 19% of p-chlorophenyl isocyanate. Polymerization was also effected at 0° to 55° C.

The embodiments of the invention in which an exclusive property or privilege is claimed are defined as follows:

1. An alkoxy pyrazolylalkane of the formula

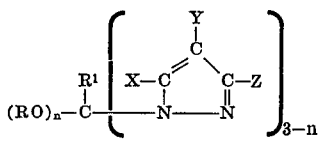

wherein:

$n$ is 1 or 2,
R is alkyl of up to 7 carbons,
R¹ is H, alkyl of up to 7 carbons, phenyl or benzyl,
X and Z are each H, alkyl of up to 8 carbons, phenyl, phenyl, halogen, or alkoxy of lower alkyl with the proviso that only one of X or Z can be alkoxy, and
Y is H, lower alkyl, phenyl, CN, NO₂ or halogen.

2. An alkoxy pyrazolylalkane according to claim 1, wherein:

$n=2$,
R=lower alkyl of 1 to 4 carbons,
R¹=hydrogen or lower alkyl, and
X, Y and Z=hydrogen or lower alkyl.

3. An alkoxy pyrazolylalkane according to claim 1, 1,1-dimethoxy-3,5-dimethyl-pyrazolylmethane.

4. An alkoxy pyrazolylalkane according to claim 1, methoxybis(3,5-dimethoxy-1-pyrazolyl)methane.

5. An alkoxy pyrazolylalkane according to claim 1, 1,1-dimethoxy-1-pyrazol-1-ylethane.

6. An alkoxy pyrazolylalkane according to claim 1, 1,1-diethoxy-1-pyrazolylmethane.

7. An alkoxy pyrazolylalkane according to claim 1, α,α-dimethoxy-1-benzylpyrazole.

8. A process for making an alkoxy pyrazolylalkane which comprises reacting a pyrazole of the formula

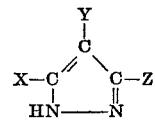

with an orthoester of the formula R¹C(OR)₃, wherein $n$ is 1 or 2,
R is alkyl of up to 7 carbons,
R¹ is H, alkyl of up to 7 carbons, phenyl or benzyl,
X and Z are each H, alkyl of up to 8 carbons, phenyl, halogen, or alkoxy of lower alkyl with the proviso that only one of X or Z can be alkoxy, and
Y is H, lower alkyl, phenyl, CN, NO₂ or halogen at a temperature between 50° C. to 200° C.

9. A process according to claim 8, employing a strong protonic acid catalyst selected from the group sulfuric acid, arylsulfonic acid, and alkylsulfonic acid.

10. A process according to claim 9, wherein the protonic acid is p-toluenesulfonic acid.

11. A process according to claim 9, wherein the molar ratio of pyrazole/ester is between about 1/2 to 3/1.

12. A process according to claim 9, wherein the molar ratio of pyrazole/ester is about 1/2.

13. A process according to claim 9, wherein the molar ratio of pyrazole/ester is about 2/1.

References Cited

UNITED STATES PATENTS 2,979,512   4/1961   Wright _____ 260—309

OTHER REFERENCES

Bredereck et al.: Chem. Ber., vol. 97, pp. 3407–17 (1964).
Hüttel et al.: Chem. Ber., vol. 92, pp. 2014–21 (1959).
Sugimoto et al.: Chem. Abst., vol. 55, column 10419 (1961).
Koehler et al.: J. Amer. Chem. Soc., vol. 92, pp. 1576–82 (1970).
Lewis et al., J. Org. Chem., vol. 12, pp. 303–7 (1947).
Ridi et al.: Chem. Abst., vol. 48, columns 4522–3 (1954).
Roberts et al.: Chem. Abst., vol. 49, columns 8864–5 (1955).

NATALIE TROUSOF, Primary Examiner

U.S. Cl. X.R.

252—189; 260—64, 67 TN, 299